(12) United States Patent
Bornmann et al.

(10) Patent No.: US 8,291,885 B2
(45) Date of Patent: Oct. 23, 2012

(54) VALVE HAVING A SLEEVE TO PREVENT CONTAMINATION AND CONDENSATION

(75) Inventors: Gerd Bornmann, Hochheim (DE); Uwe Clemen, Maintal (DE); Marcus Häuser, Gießen (DE)

(73) Assignee: Continental Automotive GmbH, Hannover (DE)

( * ) Notice: Subject to any disclaimer, the term of this patent is extended or adjusted under 35 U.S.C. 154(b) by 195 days.

(21) Appl. No.: 12/738,335

(22) PCT Filed: Oct. 21, 2008

(86) PCT No.: PCT/EP2008/064219
§ 371 (c)(1),
(2), (4) Date: Apr. 16, 2010

(87) PCT Pub. No.: WO2009/053363
PCT Pub. Date: Apr. 30, 2009

(65) Prior Publication Data
US 2010/0243937 A1 Sep. 30, 2010

(30) Foreign Application Priority Data
Oct. 24, 2007 (DE) .......................... 10 2007 050 899

(51) Int. Cl.
*F16K 1/226* (2006.01)
(52) U.S. Cl. .......................... 123/337; 251/214; 251/308
(58) Field of Classification Search .......... 251/305–308, 251/214; 123/337
See application file for complete search history.

(56) References Cited

U.S. PATENT DOCUMENTS

| | | | |
|---|---|---|---|
| 3,420,500 A | 1/1969 | Geiselman | |
| 4,214,731 A * | 7/1980 | Oota et al. | 251/306 |
| 4,294,428 A | 10/1981 | Okada et al. | |
| 4,482,128 A * | 11/1984 | Boeckman et al. | 251/163 |
| 4,541,612 A * | 9/1985 | Yohner | 251/308 |
| 5,746,190 A | 5/1998 | Honda | |
| 6,595,488 B2 * | 7/2003 | Zwick | 251/214 |
| 6,598,854 B1 * | 7/2003 | Jessberger et al. | 251/214 |

FOREIGN PATENT DOCUMENTS

| | | |
|---|---|---|
| CN | 1508419 A | 6/2004 |
| DE | 298 22 791 U1 | 5/1999 |
| DE | 696 22 248 T2 | 11/2002 |
| DE | 10 2005 051 305 A1 | 5/2007 |
| DE | 60 311 395 T2 | 11/2007 |
| EP | 0 023 953 A1 | 2/1981 |
| EP | 1 426 589 A2 | 6/2004 |
| EP | 1 574 763 A1 | 11/2006 |
| JP | 2001-304052 A | 10/2001 |

* cited by examiner

*Primary Examiner* — John Bastianelli
(74) *Attorney, Agent, or Firm* — Cozen O'Connor

(57) ABSTRACT

A housing having at least one valve seat for at least one flap, which is supported so it can rotate on a drive shaft. The drive shaft is guided on at least one side through the housing, a sleeve, through which the drive shaft is rotatably guided, being disposed fixed in place on the inside of the housing in this area. The sleeve has a first area, which faces the flap and encloses the drive shaft with a first slight play. Furthermore, the sleeve has a second area, which faces away from said flap and has a diameter expansion in comparison to the first area and which, on the front side thereof facing away from the flap encloses the drive shaft with a second slight play. Furthermore, the valve is a gas recirculation valve of a motor vehicle.

14 Claims, 2 Drawing Sheets

VALVE HAVING A SLEEVE TO PREVENT CONTAMINATION AND CONDENSATION

PRIORITY CLAIM

This is a U.S. national stage of application No. PCT/EP2008/064219, filed on Oct. 21, 2008 which claims priority to the German Application No.: 10 2007 050 899.0, Filed: Oct. 24, 2007; the content of which is incorporated here by reference.

BACKGROUND OF THE INVENTION

1. Field of the Invention

The invention relates to a valve and to a use of the valve.

2. Prior Art

Valves for gas ducts are known. DE 10 2005 051 305 A1 describes a valve that comprises a housing having a first valve seat for a first flap and a second valve seat for a second flap, which flaps are rotatably mounted on a drive shaft. The drive shaft of the valve is guided between the first flap and the second flap through part of the housing. A disadvantage with such valves is that contamination or condensate drops in the flowing medium can enter the bearings or seals of the drive shaft and damage them in a disadvantageous manner.

SUMMARY OF THE INVENTION

An object of the invention is to provide a valve in which contamination or condensate can be largely prevented from entering the bearings and seals of the drive shaft and to provide a specific use of the valve.

According to one embodiment of the invention a valve which comprises a housing having at least one valve seat for at least one flap, which flap is rotatably mounted on a drive shaft, wherein the drive shaft is guided on at least one side through the housing, and in this region a sleeve through which the drive shaft is rotatably guided is arranged fixed in place inside the housing. The sleeve has a first region which faces the flap and which encloses the drive shaft with a first slight play, and which sleeve has a second region which faces away from the flap and which has a widening in diameter by comparison with the first region and which, on its end face facing away from the flap, encloses the drive shaft with a second slight play.

The at least one side of the drive shaft is understood to be a region of an end of the drive shaft. The sleeve is of rigid design and comprises stainless steel or plastic. It is arranged fixedly in place in the housing, which can be achieved by adhesive bonding or by a latching connection. Both the first region and the second region of the sleeve form a unit and are generally produced as a single part. The first slight play can be implemented in the same way as the second slight play. These plays should be generally designed to an engineering standard, and it should be ensured here that the sleeve bears as closely as possible on the drive shaft, which, however, can still be subjected to a rotary movement in the sleeve. A widening in diameter should be chosen as large as possible to an engineering standard. The widening in diameter creates a type of storage space for dirt and possibly condensate which can then no longer reach the bearings for the drive shaft.

It has been found in a surprising manner that the valve makes it possible to virtually completely prevent dirt or condensate from entering the seals and the bearings of the drive shaft. Firstly, a first region of the sleeve makes it more difficult for dirt or condensate to enter in the direction of the bearings and seals of the drive shaft. The quantities of dirt or condensate which have then only entered to a minimum degree are then captured in the second region of the sleeve, which forms a type of storage space through the widening in diameter, with the result that any propagation of dirt or condensate in the direction of the seals or bearings is virtually completely prevented. The arrangement of the respective sleeve does not require any additional overall space for the valve, which is likewise advantageous. In this way, the life of the valve is increased in an advantageous manner.

In a preferred embodiment of the invention, a ring seal or a bearing is arranged around the drive shaft next to the end face of the sleeve and facing away from the flap. The arrangement of the sleeve in the direct vicinity of a bearing or of a ring seal makes possible an optimum overall space minimization for the valve.

According to a further preferred embodiment of the invention, it is provided that the length of the first region is designed to be twice as long as the length of the second region. It is ensured in this way that virtually no quantities of dirt or condensate can enter the second region of the sleeve.

A further preferred embodiment of the invention provides that the widening in diameter of the second region with respect to the first region of the sleeve based on the outside diameter lies in the range of 1.2 to 1.8 times wider. This dimensioning firstly allows an optimum design of the storage space through the widening in diameter. Secondly, the required overall space for the sleeve based on its functionality is minimized and at the same time ensures that already existing valves can generally be retrofitted.

According to a further preferred embodiment of the invention, the sleeve is clamped fixedly in place inside the housing by its first region. The clamping takes place by pressing the sleeve into the housing. It is advantageous here that additional fasteners, such as adhesive, can be dispensed with.

According to a further preferred embodiment of the invention, the drive shaft is guided on two sides through the housing and is guided rotatably on each side through a respectively arranged sleeve, which sleeves are in each case arranged fixedly in place inside the housing. An optimum rotatable mounting of the drive shaft is achieved and at the same time the seals or bearings of the drive shaft do not experience damage during operation from dirt or condensate.

According to a further preferred embodiment of the invention, at least one sleeve projects by its first region into the region of the flap. Consequently, the positioning of the sleeve is improved and facilitated. At the same time, it is additionally made more difficult for dirt or condensate to enter the interior of the sleeve.

According to one embodiment of the invention the valve as a gas recirculation valve of a motor vehicle. Gases which are passed through a gas recirculation valve of a motor vehicle generally contain dirt particles and condensates which after relatively short operating times can damage the seals or bearings of the drive shaft. The use of the valve according to the invention as a gas recirculation valve of a motor vehicle is therefore particularly advantageous.

BRIEF DESCRIPTION OF DRAWINGS

The invention will be explained in more detail and by way of example below with reference to the drawings.

DETAILED DESCRIPTION OF THE DRAWINGS

Figure 1:
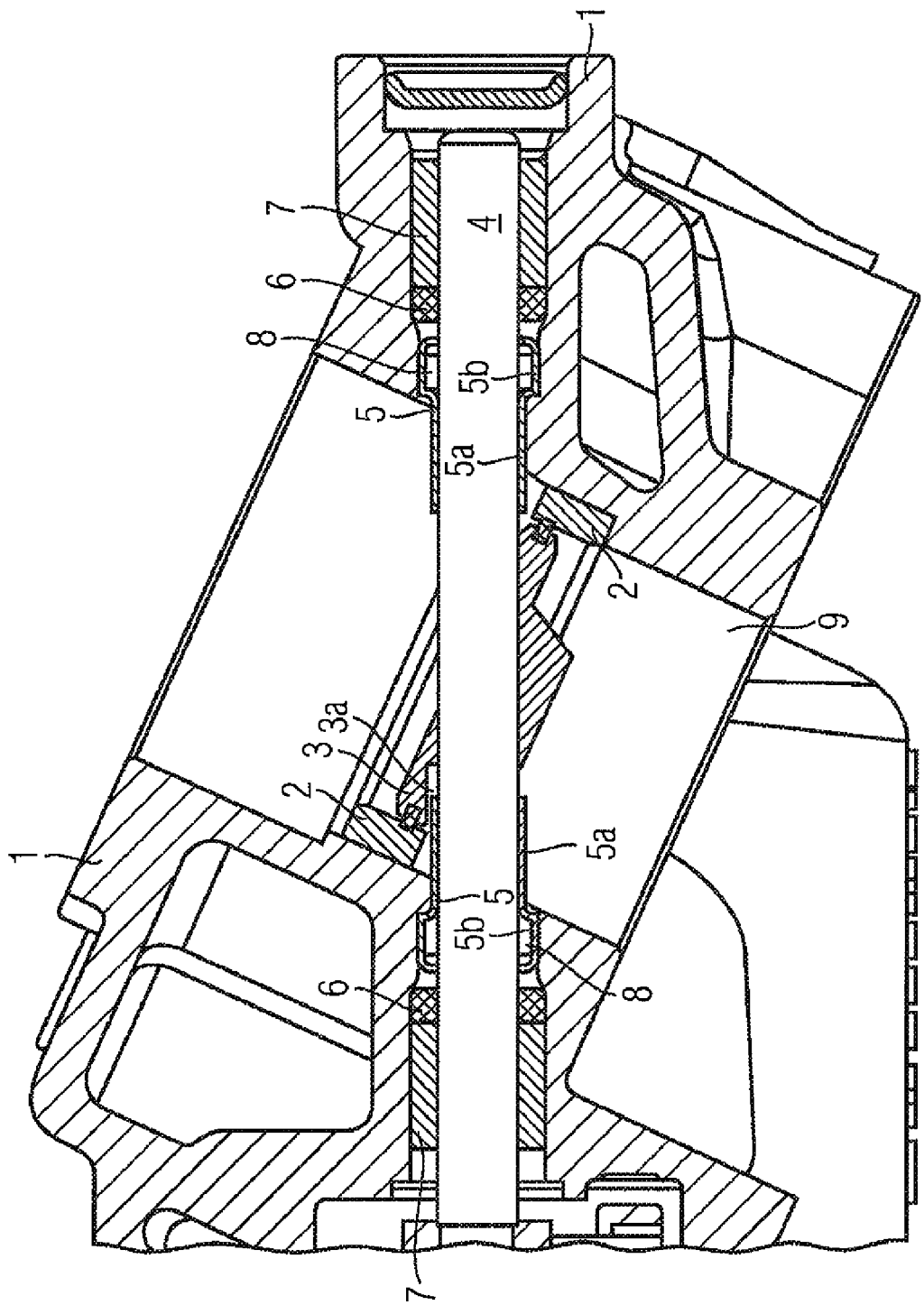
FIG. 1 is a valve in longitudinal section.

In FIG. 1, the valve is represented in longitudinal section. It comprises a housing 1 with a valve seat 2 for a flap 3, which flap is rotatably mounted on a drive shaft 4. The drive shaft 4 is guided on both sides through the housing 1. At each end region a sleeve 5 through which the drive shaft 4 is rotatably guided is arranged fixed in place inside the housing 1. The sleeve 5 has a first region 5a which faces the flap 3 and which encloses the drive shaft 4 with a first slight play. The sleeve 5 also has a second region 5b which faces away from the flap 3 and which has a widening in diameter by comparison with the first region 5a and which, on its end face facing away from the flap 3, encloses the drive shaft with a second slight play. The widening in diameter forms a storage space 8 which is suitable for capturing dirt or condensate. A ring seal 6 and a bearing 7 are arranged around the drive shaft 4 next to the end face of the respective sleeve 5 and facing away from the flap 3. Virtually no quantities of dirt or condensate pass toward ring seal 6 and bearing 7 which is achieved by the arrangement of the sleeve 5. The dirt particles or condensate droplets present in the flowing medium in the flow ducts 9 are substantially prevented in, an advantageous manner, from traveling toward the seals 6 or bearings 7 of the drive shaft 4 by the arrangement of the respective sleeve 5. It is particularly advantageous if the sleeves 5 are arranged clamped fixedly in place inside the housing 1 by their respective first region 5a. In the valve represented in FIG. 1, the drive shaft 4 is guided on two sides through the housing 1 and is rotatably mounted on each side by a respectively arranged sleeve, wherein a sleeve 5 projects by its first region 5a into the region 3a of the flap 3. The valve shown is suitable as a gas recirculation valve for a motor vehicle.

Figure 2:
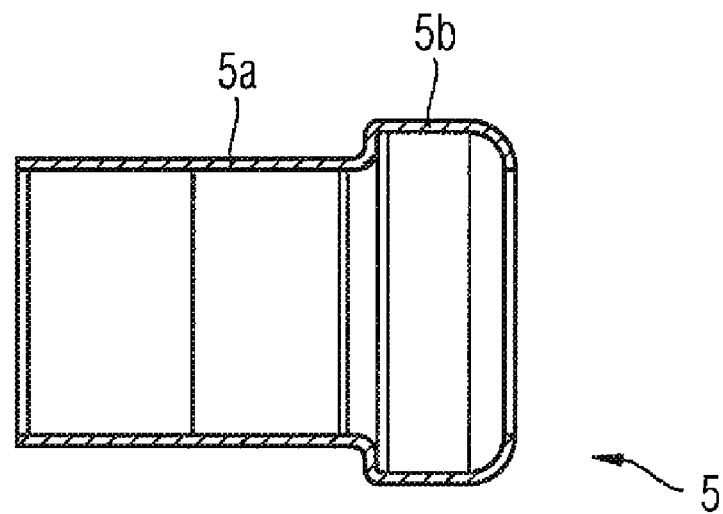
FIG. 2 is a sleeve in longitudinal section.

In FIG. 2, the sleeve 5 is represented in longitudinal section. The sleeve 5 has a first region 5a and a second region 5b. The second region 5b has a widening in diameter by comparison with the first region 5a.

Figure 3:
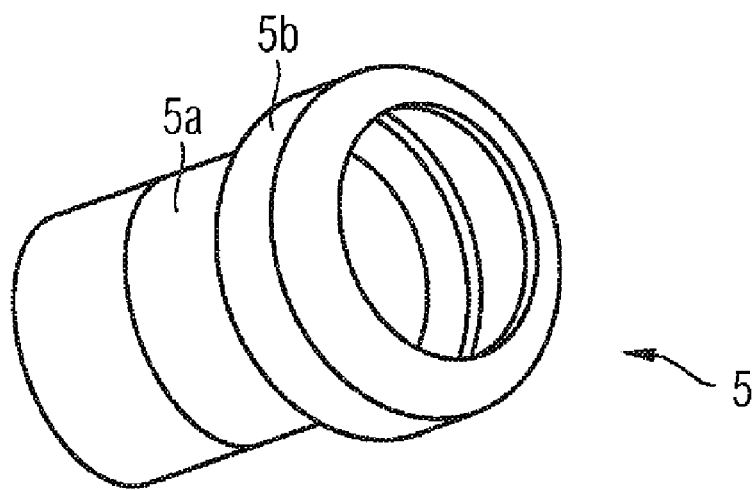
FIG. 3 is a perspective view of the sleeve of FIG. 2.

In FIG. 3, the sleeve 5 according to FIG. 2 is represented three-dimensionally. As a rule, it can be retrofitted in a relatively uncomplicated manner into already existing valves.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A valve comprising:
   at least one flap;
   a housing having at least one valve seat for the at least one flap;
   a drive shaft on which the at least one flap is rotatably mounted;
   a sleeve fixed inside the housing through which the drive shaft is rotatably guided through the housing on at least one longitudinal end, the sleeve comprising:
      a first region having a first diameter which faces the flap and which encloses the drive shaft with a first slight play; and
      a second region which faces away from the flap and which has a second diameter that is larger than the first diameter and which, on its end face facing away from the flap, encloses the drive shaft with a second slight play
      wherein the second region forms an enclosed space configured to capture at least one of dirt and condensate.

2. The valve as claimed in claim 1, further comprising at least one of a ring seal and a bearing arranged around the drive shaft arranged proximate to the end face of the sleeve facing away from the flap.

3. The valve as claimed in claim 1, wherein a length of the first region is twice as long as a length of the second region.

4. The valve as claimed in claim 1, wherein the second diameter is 1.2 to 1.8 times wider than the first diameter, based on respective outside diameters.

5. The valve as claimed in claim 1, wherein the sleeve is clamped by its first region fixedly in place inside the housing.

6. The valve as claimed claim 1, wherein the drive shaft is guided on a second longitudinal end through the housing and is guided rotatably through a second sleeve arranged fixedly in place inside the housing.

7. The valve as claimed in claim 1, wherein at least one sleeve projects by its first region into a region of the flap.

8. The valve as claimed in claim 1, wherein the valve is a gas recirculation valve of a motor vehicle.

9. The valve as claimed in claim 2, wherein a length of the first region is twice as long as a length of the second region.

10. The valve as claimed in claim 3, wherein the second diameter is 1.2 to 1.8 times wider than the first diameter, based on respective outside diameters.

11. The valve as claimed in claim 4, wherein the sleeve is clamped by its first region fixedly in place inside the housing.

12. The valve as claimed claim 5, wherein the drive shaft is guided on a second longitudinal end through the housing and is guided rotatably through a second sleeve arranged fixedly in place inside the housing.

13. The valve as claimed in claim 6, wherein the second sleeve projects by a respective first region into a region of the flap.

14. The valve as claimed in claim 7, wherein the valve is a gas recirculation valve of a motor vehicle.

* * * * *